United States Patent
Walsh

(10) Patent No.: US 11,507,165 B2
(45) Date of Patent: Nov. 22, 2022

(54) INTELLIGENT POWER MODULE

(71) Applicant: THE UNIVERSITY OF MANCHESTER, Manchester (GB)

(72) Inventor: Sam Walsh, Manchester (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 14 days.

(21) Appl. No.: 17/257,520

(22) PCT Filed: Jul. 26, 2019

(86) PCT No.: PCT/GB2019/052093
§ 371 (c)(1),
(2) Date: Dec. 31, 2020

(87) PCT Pub. No.: WO2020/021275
PCT Pub. Date: Jan. 30, 2020

(65) Prior Publication Data
US 2021/0149468 A1     May 20, 2021

(30) Foreign Application Priority Data
Jul. 26, 2018   (GB) ..................................... 1812211

(51) Int. Cl.
*G06F 1/00*       (2006.01)
*G06F 1/28*       (2006.01)
(Continued)

(52) U.S. Cl.
CPC ................ *G06F 1/28* (2013.01); *G06F 1/266* (2013.01); *G06F 1/3215* (2013.01); *G06F 1/3296* (2013.01)

(58) Field of Classification Search
CPC .................................. G06F 1/28; G06F 1/3296
See application file for complete search history.

(56) References Cited

U.S. PATENT DOCUMENTS 6,341,076 B1 *   1/2002   Kadatskyy ........ H02M 3/33569
                                                          363/56.09
9,825,468 B1   11/2017   Bryson et al.
(Continued)

FOREIGN PATENT DOCUMENTS

WO        2017/087130        5/2017

OTHER PUBLICATIONS

GB1812211.9—Search Report under Section 17(5), dated Jan. 14, 2019, 3 pages.
(Continued)

*Primary Examiner* — Mohammed H Rehman
(74) *Attorney, Agent, or Firm* — Seed IP Law Group LLP

(57) ABSTRACT

A system for power management of an electronic device. The system comprises a programmable system microcontroller; power ports configured to sink or source electrical power; and a programmable power multiplexor connected between the power ports and the system microcontroller. The system further comprises bi-directional load switches connected between the power port and a bi-directional voltage convertor, and configurable to allow electrical power to flow through the bi-directional load switch. The bi-directional voltage convertor converts a first voltage supplied by the bi-directional load switch to a second voltage and supplies power at the second voltage to the electronic device or external device through the power ports. The programmable system microcontroller controls the direction in which each bi-directional load switch allows power to flow and the second voltage, such that the system sinks or sources power at each of the power ports according to programming of the system microcontroller.

19 Claims, 9 Drawing Sheets

(51) Int. Cl.
*G06F 1/26* (2006.01)
*G06F 1/3215* (2019.01)
*G06F 1/3296* (2019.01)

(56) References Cited

U.S. PATENT DOCUMENTS

| | | |
|---|---|---|
| 2014/0103720 A1 | 4/2014 | Robinson et al. |
| 2014/0319911 A1* | 10/2014 | Alexander ............... H02J 9/062 307/22 |
| 2016/0064938 A1* | 3/2016 | Balasubramanian ... H04L 12/10 307/11 |
| 2016/0352101 A1 | 12/2016 | Koo |
| 2017/0060216 A1* | 3/2017 | Waters ....................... G06F 1/30 |
| 2017/0141610 A1 | 5/2017 | Niaki et al. |
| 2017/0331280 A1* | 11/2017 | Koenecke ................. H02H 7/20 |
| 2017/0344508 A1* | 11/2017 | Setiawan ............ G06F 13/4022 |
| 2018/0375341 A1 | 12/2018 | Sultenfuss et al. |

OTHER PUBLICATIONS

PCT/GB2019/052093—International Search Report and Written Opinion, dated Oct. 8, 2019, 15 pages.

* cited by examiner

INTELLIGENT POWER MODULE

This invention relates to a system for power management. In particular embodiments, the system is for power management of an electronic device which comprises the system and is connectable to an external device.

BACKGROUND

Embedded microprocessors enable products to become "smart" by processing for management of the device and any incorporated sensors, actuators and peripherals. Electronic devices that may include microprocessors include home appliances and vehicles and further devices in the fields of robotics, e-agriculture, smart city, smart home, smart healthcare, energy management and environmental monitoring, for example. Embedded microprocessors are widely used, for example in "Internet of Things" (IoT) devices, which typically are devices adapted to communicate with other electronic devices, for example through a wireless connection. As the number of fields in which devices including embedded microprocessors can be developed is large, the number of these devices appears set to increase to significant numbers.

A designer, researcher or manufacturer who wishes to create an electronic device including an embedded microprocessor, such as an IoT device, may desire to use a microcontroller and power supplies with their product to creating a functioning device. The processing and power requirements of the device will depend on the specifications of the device and the decision of the designer. The designer of a device may consider using development kits when creating their device. The development kits a designer may consider employing when creating their product may be pre-assembled printed circuit boards with a range of different electronic components assembled on the board to provide particular functionality. The use of such development kits speeds up the development of devices as the designer is not required to start from nothing when creating their product. However, the designer is also limited in their design by the limitations of their chosen development kit.

It is an object of embodiments of the invention to at least mitigate one or more of the problems of the prior art.

BRIEF DESCRIPTION OF THE DISCLOSURE

According to an aspect of the invention, a system for power management of an electronic device is provided, the electronic device including the system and being electrically connectable to an external device. The system comprises: a programmable system microcontroller configured to control the system; a plurality of power ports, wherein each power port is configured to sink or source electrical power; a programmable power multiplexor electrically connected between the plurality of power ports and the system microcontroller, wherein the power multiplexor is configured to: monitor a voltage received at each of the plurality of power ports; determine one of the plurality of power ports according to the voltage at the power port and one or more predetermined criteria; and supply power from the determined power port to the system microcontroller; and a plurality of bi-directional load switches, wherein each of the bi-directional load switches is electrically connected between an associated one of the plurality of power ports and a bi-directional voltage convertor, wherein each bi-directional load switch is configurable to allow electrical power to flow through the bi-directional load switch in one of a first direction or a second direction; wherein the bi-directional voltage convertor is configured to convert a first voltage supplied by the at least one electrically connected bi-directional load switch to a second voltage and to supply power at the second voltage to the electronic device or to the external device through at least one of the power ports via the associated bi-directional load switch; wherein the programmable system microcontroller is configured to control the direction in which each bi-directional load switch allows power to flow and the second voltage of the bi-directional voltage convertor, such that the system sinks or sources power at each of the plurality of power ports according to the programming of the system microcontroller.

According to a second aspect of the invention, a method of operating a system for power management is provided, the system comprising a plurality of power ports, a plurality of bi-directional load switches, each bi-directional load switch being associated with a different one of the plurality of power ports, a system microcontroller, a voltage convertor and a power multiplexor. The method comprises: determining at least one input power port and at least one output power port among the plurality of power ports; supplying electrical power from at least one power port to the system microcontroller through the power multiplexor; controlling the bi-directional load switch associated with the determined input power port to allow electrical power to pass from the determined input power port through the associated bi-directional load switch to the voltage convertor; controlling the voltage convertor to convert voltage received from the bi-directional load switch associated with the input power port to a second voltage and supply electrical power at the second voltage to a bi-directional load switch associated with the output power port; and controlling the bi-directional load switch associated with the output power port to allow the electrical power to pass from the voltage convertor to the output power port.

Advantageously, certain embodiments of the present invention provide a system for power management which allow the user to experiment with high voltages and currents in an efficient manner while protecting the system from voltages and currents outside of a predetermined safe range.

Advantageously, certain embodiments of the present invention provide a system for power management which allows a user to dynamically reconfigure the direction of power supply from or to a plurality of power ports, such that the user can design devices with an adaptive or varied power management structure.

Advantageously, certain embodiments of the present invention provide a system for power management which enables hot-swapping of power supplies, such that if a power supply used by the system is removed the system automatically switches to use another power supply. The power supply selected for use by the system may be determined based on the voltage at each power port and at least one predetermined criterion. For example, the power supply having the highest voltage may be selected for use.

Advantageously, certain embodiments of the present invention provide a system for power management which records and logs power analytics in real time, providing the user with access to advanced real time power insights so that designers can learn more about the power consumption of their circuits and products.

Advantageously, certain embodiments of the present invention provide a system for power management which provides a user with easy to use software for interfacing with and controlling the system.

Advantageously, certain embodiments of the present invention provide a system for power management which can be included as part of a larger device or module. The microprocessor can act as a slave device or co-processor for a master processor, increasing design options for devices.

Advantageously, certain embodiments of the present invention provide a system for power management which can be connected with a second system, such that one system can communicate and program the other system.

Advantageously, certain embodiments of the present invention provide a system for power management which includes wireless communication components for communication with other devices.

BRIEF DESCRIPTION OF THE DRAWINGS

Embodiments of the invention will now be described by way of example only, with reference to the accompanying figures, in which.

DETAILED DESCRIPTION

A system according to certain embodiments of the present invention is designed to provide intelligent power management of a plurality of power input/output ports. The system may dynamically control the flow of power through the system by controlling both direction of flow and voltage. The system of the present invention may otherwise be known as a System-on-Module (SoM) or an intelligent power module.

The SoM may comprise electronic components arranged in a single module. For example, the electronic components may be arranged on a printed circuit board (PCB) in order to provide a particular system function. These electronic components may be what is known as system-on-chip (SoC) components. The SoM may be otherwise known as a type of single-board computer and may be considered as an embedded computer system.

The SoM may be implemented to manage the power of an electronic device. In some examples, the electronic device may comprise the SoM and may further comprise other electronic components, such as sensors or actuators and the like. The SoM manages the power supply and consumption of such an electronic device. For example, the electronic device may be a smart battery bank, a charger, a sensor device, or a power saving device. Of course, many other types of electronic device may be configured to include the SoM for power management.

In some examples, the SoM is connectable to an external electronic device. The external electronic device may be a separate device to the electronic device comprising the SoM. For example, in the case of the electronic device comprising the SoM being a smart battery bank, the external device may be a mobile phone that can electrically connect with the electronic device to be charged.

Figure 1:
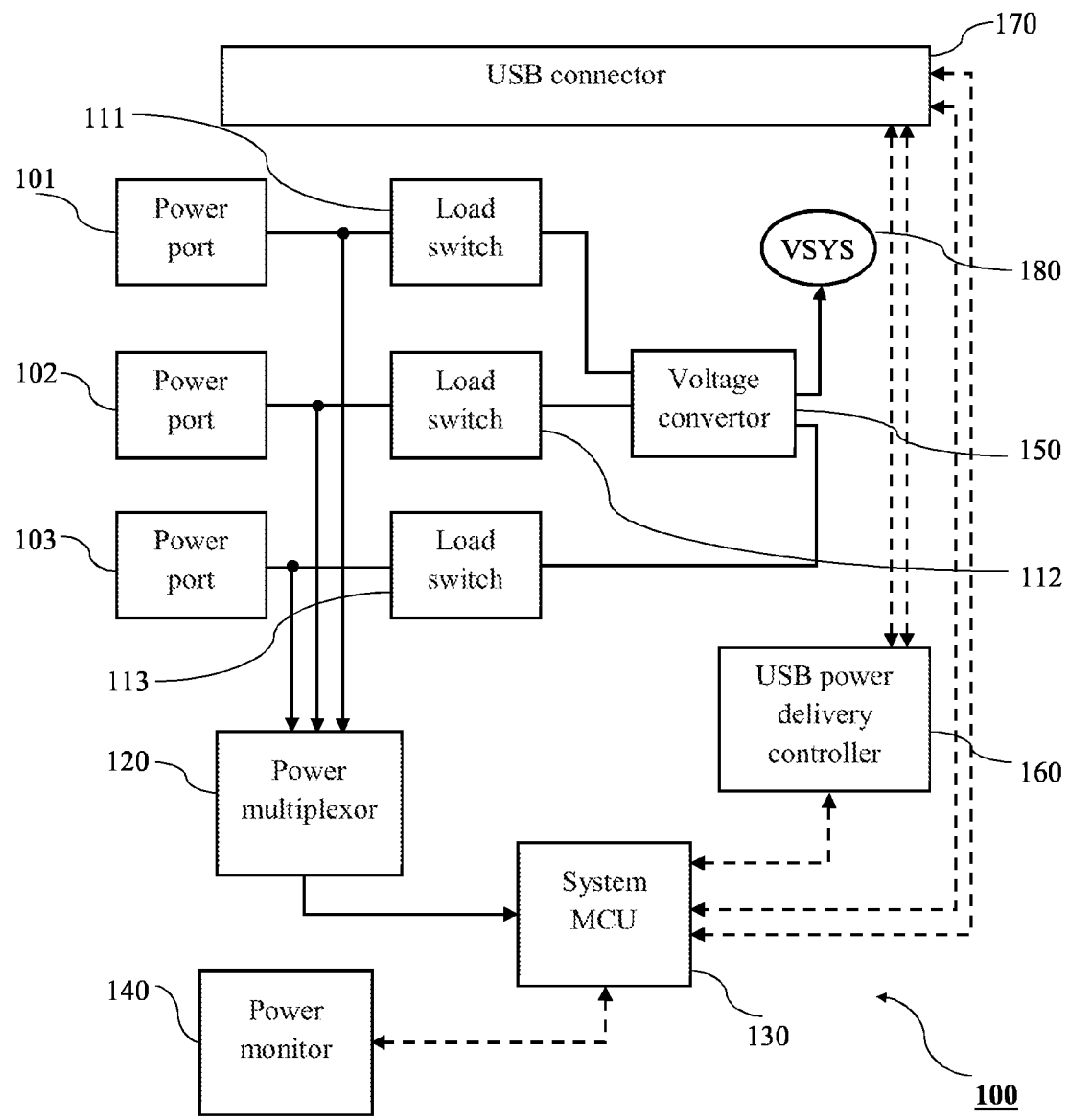
FIG. 1 is a block diagram showing an example configuration of the system.

FIG. 1 shows an example embodiment of the SoM. In the example of FIG. 1, solid lines represent power flow and dashed lines represent data flow. Further, where power lines cross, junctions are represented by circular nodes at the crossing point. This indicates that wires crossing at the junction are connected. Where lines cross without a circular node, it should be considered that these power lines are not connected to each other, but pass each other by.

The SoM 100 comprises a number of power ports, a number of load switches, a power multiplexor 120, a system microcontroller (MCU) 130, a power monitor 140, a voltage convertor 150, a USB power delivery controller 160, and a USB connector 170.

In the example embodiment of FIG. 1, the SoM 100 comprises three power ports including a first power port 101, a second power port 102, and a third power port 103. Each of the power ports is capable of sinking or sourcing electrical power into or out of the SoM 100. In some examples, the first power port 101 is a USB connector bus line that may operate at a range of different current and voltage values, and may receive from or supply electrical power to a device connected through a USB connection. The second power port 102 may be adapted to connect to a renewable power supply, such as a solar panel. The skilled person would understand that alternatively, wind energy generators or wireless charging components, such as wireless chargers based on inductive coupling, may be connected to the second power port 102. The third power port 103 may be adapted to connect to a rechargeable battery. The rechargeable battery may be a single cell rechargeable lithium battery or may comprise a plurality of cells.

It should be understood that the numbering of these power ports as first, second and third port is for example only, and that the power ports may be implemented in alternative configurations. For example, the first power port 101 may be for use with the rechargeable battery, the second power port 102 may be the USB connector, and the third power port 103 may be for use with a wireless charging module. Further, the SoM 100 may comprise a different number of power ports.

The first power port 101, the second power port 102, and the third power port 103 may be adapted to connect to external devices or electronic components. For example, the power ports may be connectable to electronic components external to the PCB via PCB edge connectors, tracks or pads and then connected to suitable physical power connectors or supplies positioned on a base board. For example, this may be a simple soldered connection. In another example, the physical power connectors may be provided on the same board as the SoM. In either example, the connectors may be screw terminal wire-to-board or push-fit crimped connectors.

To continue the example of FIG. 1 in which the first power port 101 is a USB connector, the first power port 101 is connectable to a range of electronic devices that employ USB connectors, examples of which include mobile phones, displays, tablets, chargers and battery banks. The first power port 101 is electrically connectable to such external devices and electronic components such that power can pass from the SoM 100 to the connected external device or component, or into the SoM 100 through the first power port 101. Similarly, the second power port 102 and the third power port 103 are operable as either a power input or output for the SoM 100. That is, each of the power ports can operate as a sink or source in the SoM 100. In the example where the third power port 103 is connected to a rechargeable battery, the third power port 103 may provide electrical power to the SoM 100 from the connected battery, or may receive electrical power from the SoM 100 in order to recharge the battery.

The example embodiment of FIG. 1 illustrates the SoM 100 having three power ports. However, the invention is not limited thereto and the SoM 100 may include fewer or greater number of power ports. For example, the SoM 100 may comprise power ports including power ports adapted to connect with a USB port, solar cells, wind energy generators, wireless charging modules, rechargeable batteries or other electrical power sources.

The power ports are electrically connected to the power multiplexor 120. The power multiplexor 120 automatically monitors the voltage on each of its inputs and determines an input according to the voltage at each power port and one or more predetermined criteria. In some examples, the power multiplexor 120 may determine an input having the highest voltage. In another example, the power multiplexor 120 may determine an input having a voltage within a predetermined range, or the input with the highest voltage within the predetermined range. The power multiplexor 120 supplies electrical power from the determined input to a system MCU 130. The power multiplexor 120 may also supply the electrical power from the determined input to other electronic components which are included in the SoM 100. These may be system-on-chip (SoC) modules. The power multiplexor 120 may operate based on voltage ranges set by the system MCU 130, or a second controller may be provided to offload this task from the system MCU 130. This is described in greater detail later.

The power multiplexor 120 may comprise a voltage convertor, such that it can convert electrical power received at its inputs into a desired voltage for supply to the system MCU 130. For example, an example power multiplexor may output electrical power supply to the system MCU 130 at any voltage from 0V to 7.5V and up to 500 mA. However, different power multiplexors may provide different ranges for electrical power supply. For example, circuitry may only operate up to 5V max, at which point the voltage range may be 0V to 5V. The current range may not be limited, however. For example, the SoM may power a string of a plurality of LEDs at a particular voltage, for example 3.3V, up to a large total current depending on the number of LEDs. The SoM may be scaled appropriately to deal with heat management at high currents, but the circuit would remain the same.

The power multiplexor 120 may comprise its own controller and be programmable and self-monitoring. The power multiplexor 120 is programmable at run time such that the power output from the power multiplexor 120 can be varied and controlled. For example, this may be set by a user or the power multiplexor 120 may be operated in a number of different power modes. For example, in a low power mode, the power consumption of the system may be reduced by reducing the voltage supplied by the power multiplexor 120. The power multiplexor 120 can be isolated due to having its own internal controller.

The power multiplexor 120 intelligently monitors its power inputs received from connected power ports, and supplies electrical power to the system MCU 130 based on voltages at each of the connected power ports and at least one predetermined criterion. In some examples, the power multiplexor 120 determines the power port having the highest voltage among the connected power ports, and supplies electrical power to the system MCU 130 using this determined power port. The power multiplexor 120 is connected to the power ports between other components in the SoM 100. That is, the power multiplexor 120 is connected in parallel with the load switches. Consequently, the system MCU 130 remains powered as long as one of the power ports is providing power to the SoM 100, regardless of the programming or power supply to other parts of the SoM 100, such as the load switches. Further, as the power multiplexor 120 swaps between its inputs based on the measured voltage of each input and the predetermined criterion, the power supplies to the system may be changed without interrupting the power supply to the system MCU 130. This may be otherwise known as hot-swapping. For example, in a situation where the first power port 101 and the second power port 102 are providing electrical power to the SoM 100, and the power multiplexor 120 is powering system MCU 130 using power received from the first power port 101, if the first power port 101 is disconnected the power multiplexor 120 will automatically start supplying power to the system MCU 130 from the second power port 102. This prevents interruptions of power supply to the system MCU 130, which improves the reliability of the SoM 100 and any connected devices.

Each of the power ports is electrically connected to a controlled load switch. This may otherwise be known as an E-Fuse or load switch. The controlled load switch that is connected to a particular power port may be said to be associated with that power port. In the example of FIG. 1, the first power port 101 is electrically connected to a first load switch 111; the second power port 102 is electrically connected to a second load switch 112; and the third power port 103 is electrically connected to a third load switch 113. While the example embodiment of FIG. 1 illustrates the SoM 100 having three load switches, the skilled person would understand that the SoM 100 may comprise a different number of load switches depending on the number of power ports comprised by the SoM 100. For example, the SoM may comprise a greater number of power ports and the corresponding number of load switches. Additionally, the inputs to the power multiplexor 120 may be scaled to match the number of power ports.

The load switches act to keep voltage and current within safe ranges. In some examples, this range may be 0V to 20V and 0 A to 5 A. This range may be limited by the specifications of the power ports or connected devices. For example, some USB specifications have a max wattage of 100 W. However, it should be understood that the load switches may be scaled beyond this example range to higher voltage and current values according to the specifications of system power ports or connected devices. Electrical power supplied from or to one of the power ports is passed through a load switch to protect the SoM 100 and connected devices or components. Each of the load switches is programmable, and the safe range for voltage or current can be defined by a designer according to the specifications of their product. The system MCU 130 can control the current and voltages allowed to pass by each load switch separately. In some examples, a connected device may specify strict limits, depending on specifications of internal components of the connected device. In one example, a connected mobile phone may specify a strict <4.2V limit, as this may be the maximum rating of internal components. The load switches are then set to only allow electrical power with a voltage of less than 4.2V to pass through. In another example, the safe voltage may be higher, such as 20V, depending on the rating of connected components.

Each load switch has an internal controller which monitors the current across a sense resistor outside of the load switch system-on-chip package. Alternatively, inductive sensing may be used. If the current or voltage is detected to be outside of the determined safe range, the load switch will enter an isolated safe-state and signal to the system MCU 130 or a master MCU that a fault has occurred. This acts to protect the SoM 100 and connected components or devices from damage associated with delivery of electrical power at too high voltage or current values. The SoM 100 is therefore protected by the load switch modules, and faults are not passed through to the rest of the board.

The first load switch 111, the second load switch 112 and the third load switch 113 may be a model that can be 'soft-started'. That is, each load switch may be turned on after a specified time delay to limit "inrush" current. Inrush current can occur when a device is turned on and too much current flows into the device, causing damage. The soft-start of the load switches means that the current allowed to pass through each load switch is gradually increased to reduce the risk of damage to other components on the SoM 100 that are receiving power from the load switches due to inrush current.

The first load switch 111, the second load switch 112 and the third load switch 113 are bi-directional and can control the flow of electrical power in either direction through the load switch. Each of the first load switch 111, the second load switch 112 and the third load switch 113 is controllable by the system MCU 130 or a master MCU. The use of bi-directional load switches enables the system MCU to reconfigure the flow of power through the SoM 100. For example, the system MCU 130 can control the load switches separately by turning switches on or off or changing the direction of current flow allowed by each switch, in order to route electrical power from any of the power ports to any other power port.

The load switches can be controlled by the system MCU 130 according to the programming of the system MCU 130. This can be performed dynamically while the system is running. Both the direction and allowed voltage or current ranges may be controlled dynamically. The SoM 100 provides intelligent, reconfigurable power management capabilities through the control of the load switches, as electrical power can be rerouted at will through the SoM 100 and in/out of any of the power ports as selected by the designer or user. This affords a designer or user a high degree of flexibility when designing devices that employ the SoM 100, as well as enabling more complex devices which employ a variety of different power sink/source functions during use. Further, the SoM 100 and connected peripherals are protected from abnormal currents or voltages.

The first load switch 111, the second load switch 112 and the third load switch 113 are electrically connected to a voltage convertor 150. The voltage convertor 150 is capable of converting electrical power from a first voltage to a second voltage. For example, the voltage convertor 150 may have a range of 0-20V and 0-5 A, corresponding to some USB standard maximum power specifications. However, the range of the voltage convertor 150 may be different depending on the specification of system power ports or connected devices. The voltage convertor 150 is also bi-directional, as with the load switches, and can be controlled by the system MCU 130 to control the direction of flow of electrical current in the SoM 100. The voltage convertor 150 can also be controlled by the system MCU 130 to convert electrical power to voltages specified by the user, designer or based on information received from connected devices. For example, if the SoM 100 is connected to an external device through the USB connector of the first power port 101, the connected external device may advertise a desired power level to the SoM 100. The system MCU 130 may then control the voltage convertor 150 to convert electrical power, received at a first voltage from the second power port 102 or the third power port 103, passed through the second load switch 112 or the third load switch 113 respectively to the voltage convertor 150, to a second voltage to be supplied to the external device through the first load switch 111 and the first power port 101. In this example, the SoM 100 may act as part of a smart battery bank for charging a mobile device. Alternatively, the direction of current flow may be reversed if the external device is capable of providing power (for example, if it is a USB charger) in order to provide power to the SoM 100.

The voltage convertor 150 may be connected to other electronic components when the SoM 100 is integrated into an electronic device. For example, the SoM 100 may be integrated into a range of devices to act as a power management module for the device. In this case, the SoM 100 may monitor and control power supply aspects of the device. The SoM 100 may determine a power required by other electronic components of the device, such as sensors or actuators, and the voltage convertor 150 may convert power received from one of the power ports through an associated load switch to the determined required power, and supply this to the connected components. This is represented in FIG. 1 as VSYS 180. For example, VSYS 180 may be the higher voltage of the system, and if the system is configured to supply or receive power from a rechargeable battery, VSYS 180 may be set depending on the number of cells or batteries used. For example, if a lithium battery with a charged voltage of 4.2V is used, then VSYS 180 may be set to 4.2V multiplied by the number of cells or batteries used. In one example, a 4-cell battery is used and VSYS is set to 16.8V. However, VSYS 180 may be set to any other value depending on the requirements of connected components.

The voltage convertor 150 is capable of converting power to a specified voltage for recharging rechargeable batteries. For example, in the embodiment where the third power port 103 is connected to a rechargeable lithium battery. The voltage convertor 150 may convert electrical current received from the first power port 101 or the second power port 102 to a particular voltage required for charging the rechargeable battery of the third power port 103. This voltage may depend on the particular battery used or the number of cells in the battery.

The voltage convertor 150 may include an internal controller and may be capable of monitoring itself. The voltage convertor 150 may monitor the current and voltage values of power passing through the voltage convertor 150 and may contain methods of electrical protection such as fuses. The voltage convertor 150 can also be isolated programmatically by the system MCU 130.

In some examples, the voltage convertor 150 may be a buck-boost convertor. In some examples, the voltage convertor 150 may have a lower range specified by the minimum voltage that a component, such as a rechargeable battery, can safely use. In one example, the minimum voltage a lithium battery can go to safely is 3V, so the voltage convertor 150 may operate with 3V as the lower limit for its output, so that the battery doesn't fail. In another example, the voltage convertor 150 may output power at 1.8V to power sensitive low voltage electronics. The maximum output of the voltage convertor 150 may depend on the specification of connected components or power ports. For example, it may be 20V, corresponding to the maximum voltage specified by some USB standards.

As noted above, the system MCU 130 operates to control the other components of the SoM 100. The system MCU 130 may be a microprocessor or a processor that operates based on programming set by the user or designer. As an example, any of the ARM Cortex-M series MCU's would be suitable for this task. Alternatively, chips made by Cypress known as PSoC's (Programmable System on a chip) which include analogue circuitry such as op amps and current sensing may be employed. Further suitable model numbers would be PSoC, STM32, NRF51/52, ESP32, or ESP8266. The system MCU 130 may interface with a user through a user interface, enabling a user to interact with and control the SoM 100 from a high-level interface. Other methods of programming and debugging the system MCU 130 will be discussed later.

The system MCU 130 receives information regarding each of the inputs or outputs of the SoM 100, and controls each of the parts of the SoM 100 according to its programming. For example, the system MCU 130 may control each of the load switches to route electrical power to or from a particular power port. The system MCU 130 also controls the voltage convertor 150 such that electrical power is delivered at a voltage level set by the system MCU 130.

The system MCU 130 can be used as a main processor for a device or as a co-processor in a multiprocessor system. When the system MCU 130 is the sole processor, the system MCU 130 uses its own GPIO/ADC/DAC/serial lines to interface and connect with external devices or components. When the system MCU 130 operates as a co-processor in a multiprocessor system, the system MCU 130 accepts serial commands. For example, the SoM 100 may be connected to a master processor which may perform the main processing of the system, with the SoM 100 acting as a power interface module to control power supply to the rest of the system. This will be discussed later with reference to FIG. 9.

As well as controlling the functions of the other parts of the SoM 100 to control overall power management and consumption, the system MCU 130 may also control the amount of power it itself is supplied with from the power multiplexor 120. The system MCU 130 may instruct the power multiplexor 120 to supply the system MCU 130 with electrical power at a particular voltage or current depending on user preferences or the requirements of the system MCU 130 at a given time point. For example, the system MCU 130 may operate at a number of different voltages depending on its functions, and may enter a power saving mode in which it requests power at a lower voltage from the power multiplexor 120 in order to reduce SoM 100 power consumption.

The power monitor 140 monitors all voltage lines of the SoM 100 and logs voltage and current information in an internal memory. The power monitor 140 provides this information to the system MCU 130. A user may view the power information in real time or the information may be retrieved from the internal memory of the power monitor 140 in the event of a crash. The power information may be used by a user to achieve power insights into the power consumption of the system that can be used by a designer to inform design choices. For example, the power monitor 140 may monitor voltage at the voltage convertor 150. An example part which may be employed as the power monitor 140 is the Microchip PAC1934. To add further channels, additional quad channel power monitors could be added, or a multichannel power monitor may be constructed from a number of single input power monitors, a separate MCU, and a separate memory chip.

The power monitor 140 may be a quad input/output high resolution power monitor, for example. That is, the power monitor 140 may monitor a plurality of different input/outputs simultaneously. The power monitor 140 may also be configured with coulomb counting to monitor a state of charge of a rechargeable battery in the SoM 100.

The USB power delivery controller 160 enables the system MCU 130 to communicate with other devices in order to establish host-guest information and voltage-current information for connection with other devices through a USB connector 170.

In some examples, the USB power delivery controller 160 and USB connector 170 may operate to the USB-Type C standard. USB-Type C requires configurations to particular lines of the USB-Type C connector 170 and employs resistor flipping to communicate with other devices. For example, if a USB-Type C device is connected to the SoM 100, the USB power delivery controller 160 enables the SoM 100 to communicate with the USB-Type C device in order to establish the values of voltage and current at which the connected device requires or can provide power. In the example where a USB-Type C device is connected to the SoM 100, then at least one of the power ports of the SoM is adapted to sink or source electrical power through a USB-Type C connection with the USB-Type C device. Although the USB connector 170 is shown separately to the power ports of FIG. 1, it may be understood that a data transfer through the USB connector 170 and power transfer through the at least one power port that is connectable to a USB-Type C device may be performed through a single USB-Type C connector. For example, the first power port 101 and the USB connector 170 of FIGS. 1 and 9 may be a single USB-Type C connector. In another example, the SoM 100 may comprise a USB connector 170 that is separate to the power ports. For example, a USB hub IC may be added, or a dual USB MCU may be employed, such that the SoM could be programmed through a second USB connection while provided power through a first USB connection.

USB-Type C devices can operate in a number of different configurations which are defined in the USB-C standard. The USB power delivery controller 160 communicates with an external device which connect with the USB connector 170 to inform the connected devices of the configuration that the SoM 100 is operating in, as well as to receive information about the configuration that the connected device is operating in. The configuration that the SoM 100 is operating in may be set by the system MCU 130 according to its programming.

In the example where the connected device and the USB connector 170 operate according to USB-Type C, the USB power delivery controller 160 communicates with the USB connector 170 through CC1 and CC2 pins. The system MCU 130 communicates with the USB connector 170 through USB2 and serial wire debug (SWD).

The USB connector 170 may further be operated to transfer data to or from the SoM 100 via the wired USB connection. This data transfer is not limited to information relating to power supply or consumption, as exemplified above, but may include any other type of data. For example, the SoM 100 may be included in a device which further comprises sensors to collect data. The data collected by the sensors may be transmitted through the USB connector 170 to a connected USB device. This may occur regardless of if the SoM 100 is receiving power through a USB connection at one of the power ports, or is powered by another power source.

The system MCU 130 controls the direction of flow of current through the load switches, the voltage output from the power multiplexor 120 and the power output through the voltage convertor 150. Thus, the system MCU 130 can dynamically control the power consumption and output of the SoM 100.

Further, as the power multiplexor 120 is connected between the power ports and the load switches, the SoM 100 and system MCU 130 stay powered despite the programming of the load switches as long as one of the power ports is supplying power to the system. This improves the reliability of the SoM 100, as power to the system is continued despite errors or mistakes in control of the load switches.

The SoM 100 may include additional components not illustrated in the example of FIG. 1. For example, the SoM 100 may additionally include a wireless communication module and a master or user processor, as will be discussed in relation to FIG. 9. Further, it should be understood that not all of components shown in the example of FIG. 1 are required, and parts may be omitted in certain implementations. For example, the SoM 100 may comprise a different number of power ports. It should also be understood that components may be omitted in use but still physically present on the SoM 100, and may be electrically isolated or disabled such that they do not draw electrical power or interact with the other components in the system.

Figure 9:
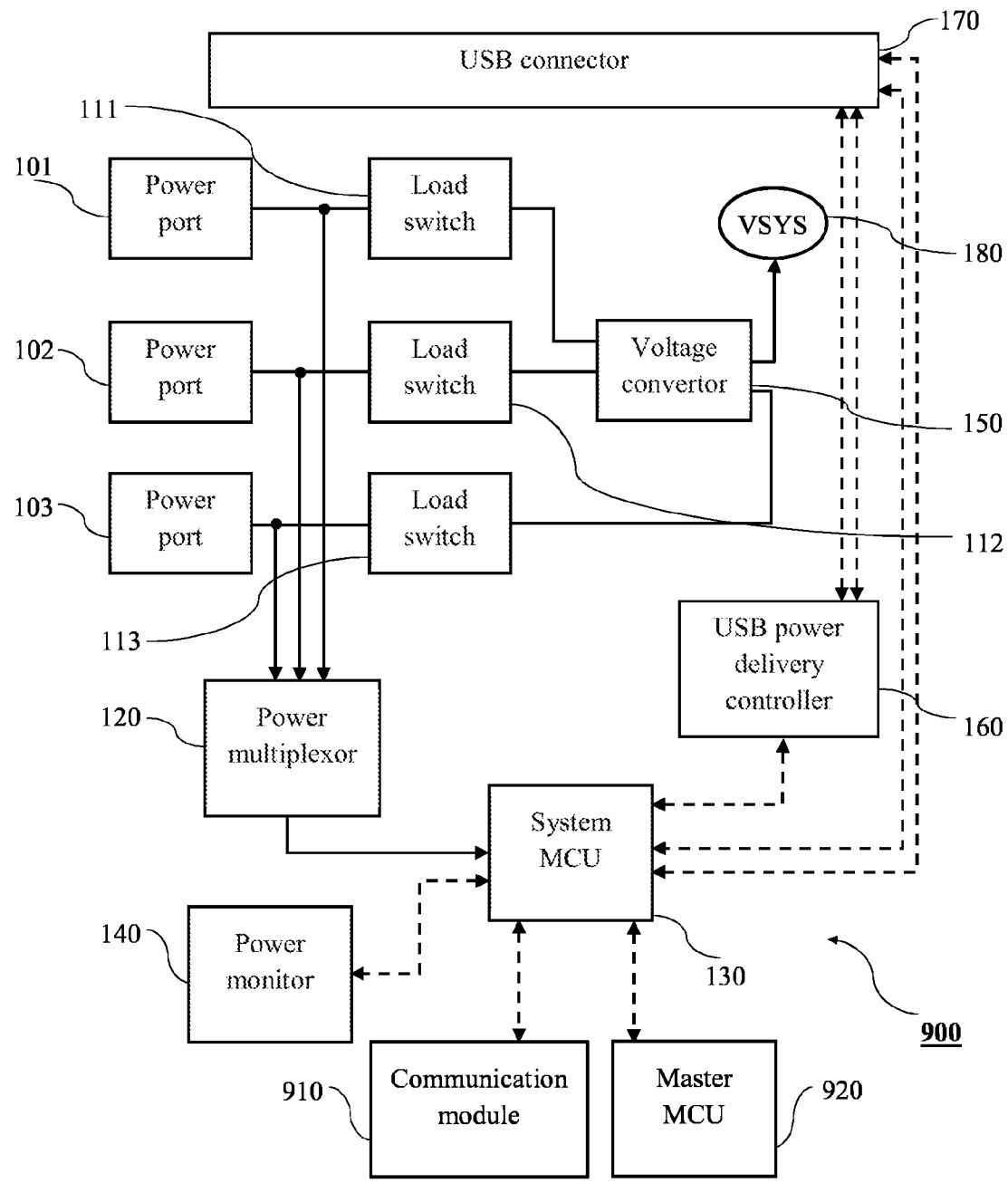
FIG. 9 is a block diagram showing an alternative example configuration of the system.

As noted above, the SoM 100 may include additional components that are not shown in the example of FIG. 1. FIG. 9 shows another example configuration of the SoM 900, in which the SoM 900 further includes a communication module 910 and a master MCU 920. The communication module 910 may be a wireless communication module that enables the SoM 900 to communicate with external modules or devices wirelessly. For example, the communication module 910 may communicate with electronic device using a wireless LAN, WAN, Bluetooth or cellular data such as LTE communication. The communication module 910 may include antennae to facilitate wireless communication. Alternatively, the communication module 910 may be a wired communication module that enables the SoM 900 to communicate through a wired connection with external modules or devices. The communication module 910 may comprise both wireless and wired communication modules. The system can communicate through a USB-Type C connector to other USB devices using the USB CDC or HID specification from a supported MCU. It can also be controlled by another wired processor and the MCU GPIO/Serial lines. The communication module 910 may be used to connect the SoM 900 to a server or to remote sensors, for example. The communication module 910 may be a system-on-chip component mounted to the same board as the SoM 900 power manager of FIG. 1, or may be mounted to a separate board and connected to the SoM 100 of FIG. 1 through wired connections.

The SoM 900 may also include additional processors. For example, the SoM 900 may include a master processor 920 or user processor. The master processor 920 may control the functions of connected devices or components when the SoM 900 is embedded in a device, while the system MCU 130 controls the power management processes of the SoM 900. The master processor 920 or user processor may be a board mounting system-on-chip component which communicates with the SoM 900 power management system over PCB tracks, where the master processor 920 or user processor is mounted to the same board as the power management system described in FIG. 1. Alternatively, the master or user processor may be a separate processor board which communicates with the SoM 900 over wires. It is envisaged that the SoM of the disclosure may comprise neither, one, or both of the Communication module 910 and Master MCU 920.

Figure 2:
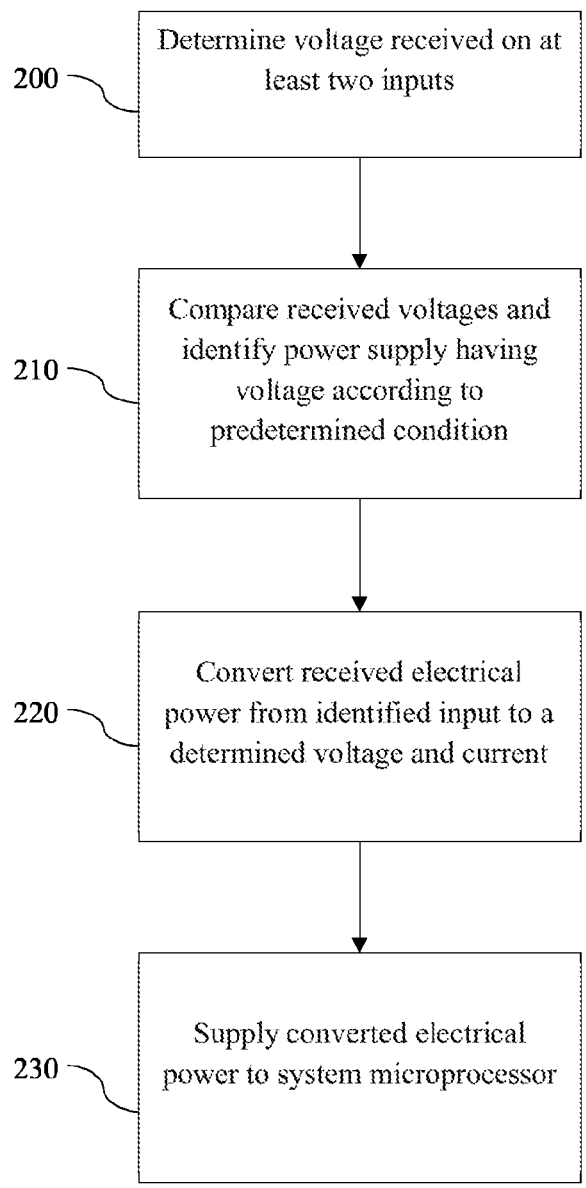
FIG. 2 is a flowchart showing an example method of operation of a power multiplexor in the system.

FIG. 2 is a flowchart showing an example process executed by the power multiplexor 120. FIG. 2 is an example only, and it should be understood that steps of the flowchart may be omitted, or additional processes may be executed by power multiplexor 120.

At step 200, the power multiplexor 120 receives electrical power on at least two inputs and measures the voltage at which electrical power is received at each input. For example, electrical power may be received from the first power port 101 and the second power port 102 on a first and second input of the power multiplexor 120 respectively. In another example, electrical power may be received from each of the power ports.

At step 210, the power multiplexor 120 compares voltages of electrical power received on each of the inputs and determines or selects an input based on at least one predetermined criterion and the measured voltage at each input. In some examples, the power multiplexor 120 selects the input having the highest voltage.

At step 220, the power multiplexor 120 converts electrical power received from the determined input to electrical power having a voltage and current specified by the system MCU 130. The power multiplexor 120 is programmable by the system MCU 130 to set the voltage and current values to which the power multiplexor 120 converts the received electrical power. This may be performed according to user control, for example, and may correspond to different uses of the SoM 100 or different power modes. For example, the voltage may be determined to be low when the user initiates a power saving mode.

At step 230, the power multiplexor 120 supplies electrical power at the determined voltage and current to the system MCU 130.

The power multiplexor 120 automatically monitors each of its inputs and automatically switches to the input providing electrical power at the highest voltage. If a power input that is being used by the power multiplexor 120 to power the system MCU 130 is interrupted, the power multiplexor 120 automatically switches to a new input among the active inputs on the power multiplexor 120 based on the measured voltage at each input and the one or more predetermined criteria. Thus, the system MCU 130 is powered as long as the power multiplexor 120 is receiving electrical power from at least one input, and the power supplies to the system can be connected, disconnected or swapped without interrupting power supply to the system MCU 130.

Figure 3:
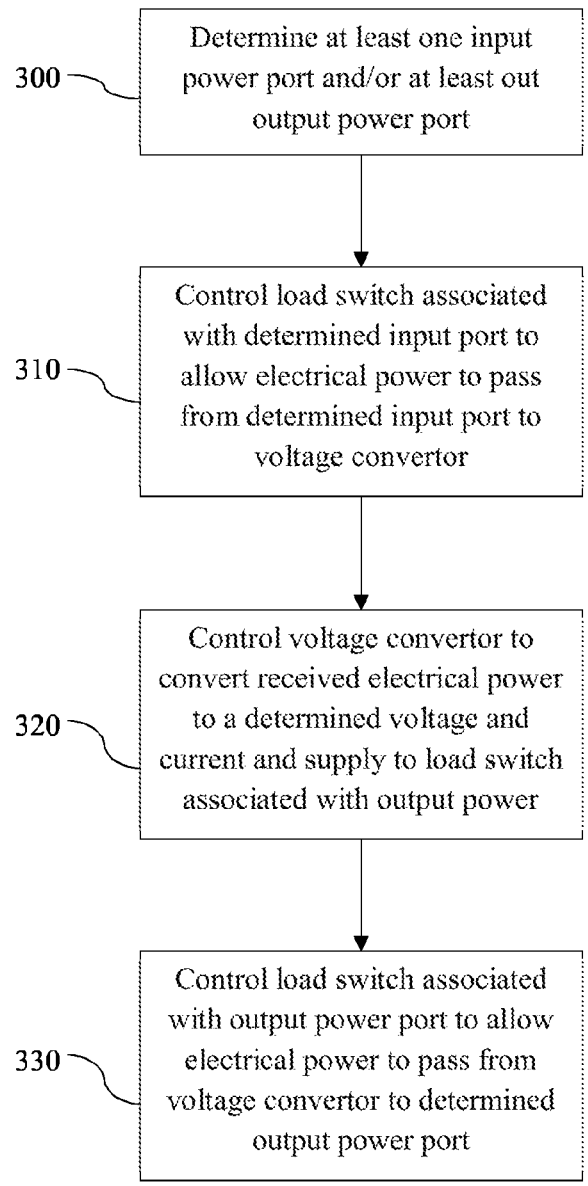
FIG. 3 is a flowchart showing an example method of operation of a system microprocessor in the system.

FIG. 3 is a flowchart showing an example process executed by the system MCU 130. FIG. 3 is an example only, and it should be understood that steps of the flowchart may be omitted, or additional processes may be executed by system MCU 130.

At step 300, the system MCU 130 determines at least one input power port and/or at least one output power port from the available power ports. The input power port is a power port which supplies electrical power to the system. The output power port is a power port to which the system supplies electrical power. In some examples, the system MCU 130 determines input and output power ports according to predetermined and stored instructions, user control, or instructions received from connected devices.

At step 310, the system MCU 130 controls a load switch associated with the determined input power port to allow electrical power to flow from the input power port into the system. The load switch may only allow electrical power having current and voltage values within a particular range to flow into the system. This range is programmable by the system MCU 130. The load switch is electrically connected to a bi-directional voltage convertor 150, and the electrical power from the input power port is directed from the input power port through the associated load switch and is supplied to the voltage convertor 150.

At step 320, the system MCU 130 controls the voltage convertor 150 to convert the electrical power received from the input power port to a predetermined voltage and current. The voltage and current values may be predetermined by a manufacturer or may be set by the system MCU 130 according to its programming or user control. For example, the voltage and current values may be changed according to a type of external device connected to the system. The converted electrical power is supplied to a load switch associated with the determined output power port.

At step 330, the system MCU 130 controls the load switch associated with the determined output power port to allow the received electrical power to pass from the voltage convertor 150 through the load switch to the determined output power port. For example, there may be an external device connected to the output power port which receives the electrical power. In another example, there may be a rechargeable battery connected to the output power port which uses the electrical power to recharge.

The example of FIG. 3 describes a situation in which there is at least one input power port and at least one output power port. However, the disclosure is not limited to this example, which is provided to illustrate how the system MCU 130 controls parts of the SoM 100 to reconfigure power supply and distribution. The reconfiguration of the SoM 100 will now be described through a number of example implementations. The skilled person would understand that these are given for examples only, and that the invention is not limited to these example implementations.

In a first example implementation, the SoM 100 may be used as a single power input USB-Type C mobile device sensor, running at a first voltage and current and communicating back to the mobile phone using the USB connection. In this case, the system MCU 130 configures the USB power delivery controller 160 to advertise as a current sink capable of sinking electrical power at the first voltage and current to the connected mobile device. The system MCU 130 enables the first load switch 111 as a sink. Electrical power passes from the connected mobile device through the USB connection that is the first power port 101, to the power multiplexor 120. The power multiplexor 120 supplies the system MCU 130 with electrical power at a second voltage and current. The system MCU 130 may control the power multiplexor 120 to supply power at a different voltage or current after the system switches on. Once the system MCU 130 is switched on, it can execute custom user software stored thereon to interface with attached sensors. The attached sensors may also be powered by the same power supply as with the system MCU 130. The information from the attached sensors can then be transmitted to the connected mobile device through USB data lines. In this case, the system MCU 130 appears as a USB device to the connected mobile device. In this particular example, the first load switch 111 is enabled and can be configured by the system MCU 130.

In a second example, the SoM 100 is employed in a wired sensor/actuator embedded system running at a different voltage and current to the first voltage and current of the first example. This example is similar to the first example, in that the SoM 100 may form part of a device which further comprises a sensor or actuator, and electrical power is received through a wired connection at one of the power ports. For example, electrical power may be received through a USB-Type C connection at the first power port 101. In the second examples, the system MCU 130 controls the USB power delivery controller 160 to advertise the voltage and current values required by the SoM 100. If more power is required after the voltage is provided through the USB cable, the SoM 100 advertises this through the connection. For example, the SoM 100 may advertise that it requires more electrical power in order to power the sensors or actuators. Alternatively, the SoM 100 may be operated in a power saving mode, and may advertise that it requires less electrical power through the USB connection.

In a third example, the SoM 100 sources power out of the first power port 101 instead of sinking it from a connected host device. For example, this may be the case if the SoM 100 is implemented in a smart battery bank or charger. In this example, the SoM 100 connects to an external device through a USB connection. The SoM 100 receives power through either the second power port 102 or the third power port 103. For example, this could be a rechargeable battery or solar panel input. Either the second load switch 112 or the third load switch 113 is enabled depending on if power is supplied from the second power port 102 or the third power port 103, such that power is supplied to the bi-directional voltage convertor 150. The bi-directional voltage convertor 150 converts the supplied voltage to the value that is specified by the system MCU 130 (according to user programming) to be advertised by the USB power delivery controller 160. The USB power delivery controller 160 may advertise more than one option for power supply to the connected external device. The electrical power is supplied from the bi-directional voltage convertor 150 to the first power port 101 through the first load switch 111. The skilled person would understand that the selection of first, second and third power ports in this example is arbitrary, and that power can be routed from any one of the ports to any other port.

In a fourth example, the SoM 100 operates as a stand-alone, single-power-input, battery power embedded system using the system MCU 130 as the main system controller. In this case, power is supplied from a battery at the third power port 103 (for example), and used to power the SoM 100 and any peripheral components such as sensors or actuators. This data from the peripheral sensors may be passed through the USB-Type C connection without sinking or sourcing power through the USB-Type C connection. Depending on the requirements of the sensors, the voltage convertor 150 may be used or not to convert the voltage received from the battery to a different voltage for use in the sensors.

In a fifth example, the SoM 100 is powered at each of the first power port 101, the second power port 102 and the third power port 103. The SoM 100 is able to swap or reroute power between each power port, and can operate based on a power supply determined based on a measured voltage of each power supply and one or more predetermined criteria. For example, the SoM 100 may operate based on whichever power supply is providing the highest voltage. In this example, the system MCU 130 controls each of the first load switch 111, the second load switch 112 and the third load switch 113 to control the direction of power supply. For example, the system MCU 130 may control the load switches such that power from a battery at the third power port 103 is supplied out of a USB-Type C connection to an external device connected at the first power port 101. The system MCU 130 may also control the load switches to direct power from the second power port 102 (which may be a solar cell, for example) to recharge the battery at the third power port 103. Each supply of power can be converted to a higher or lower voltage by the voltage convertor 150 during run-time according to instructions from the system MCU 130.

Figure 4:
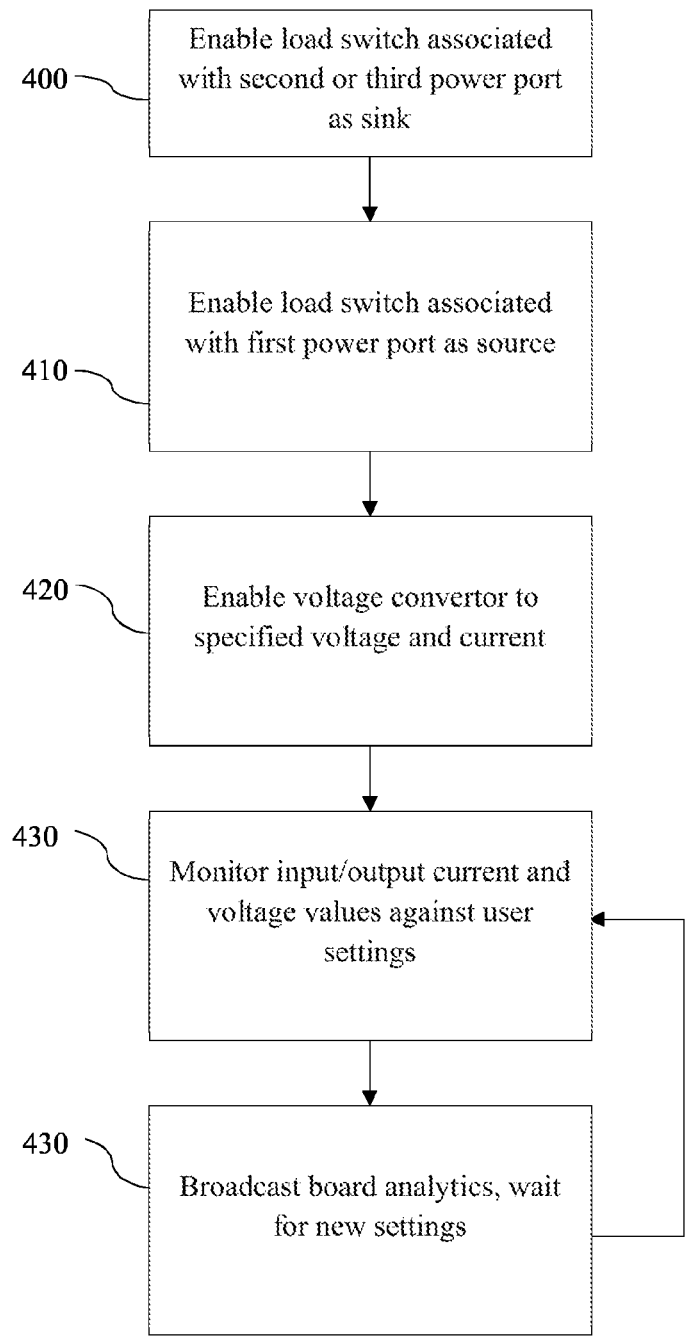
FIG. 4 is flowchart showing an example method of operation by the system according to one example in which the system is operating as an outlet.

FIG. 4 is an example process executed by the SoM 100 according to one example implementation. In the example of FIG. 4, the SoM 100 is operating as an outlet. For example, the SoM 100 may be included in a USB-Type C smart battery bank device.

At step 400, the SoM 100 enables the load switch associated with the second power port 102 or the third power port 103 as a sink.

At step 410, the SoM 100 enables the first load switch 111 associated with the first power port 101 as a source.

At step 420, the SoM 100 enables the voltage convertor 150 to convert electrical power received from the second power port 102 or the third power port 103 to a specified voltage and current. For example, in the case of the SoM 100 operating as part of a USB-Type C smart battery bank device, the specified voltage and current values may be 19V and 4 A respectively.

At step 430, the SoM 100 monitors current and voltage values in the system against user settings. For example, this may be performed by the power monitor 140.

At step 440, the SoM 100 broadcasts the board analytics obtained by monitoring the current and voltage values in the system. For example, the SoM 100 may supply the board analytics to a user. The current and voltage information may also be supplied to the power multiplexor 120 for use in determining which power input should be used. The board analytics may also be supplied to connected devices, for example devices connected through a USB connection, in order to inform connected devices of power related information of the SoM 100. The SoM 100 waits for new settings, and returns to step 430 to continue monitoring. In other words, the SoM may transmit data to either a user or nearby devices. In some examples, such as with Internet of Things devices, a 'Publish-Subscribe' communication system such as MQTT may be used, in which devices broadcast information to a central hub and receive subscribed messages from the hub.

Figure 5:
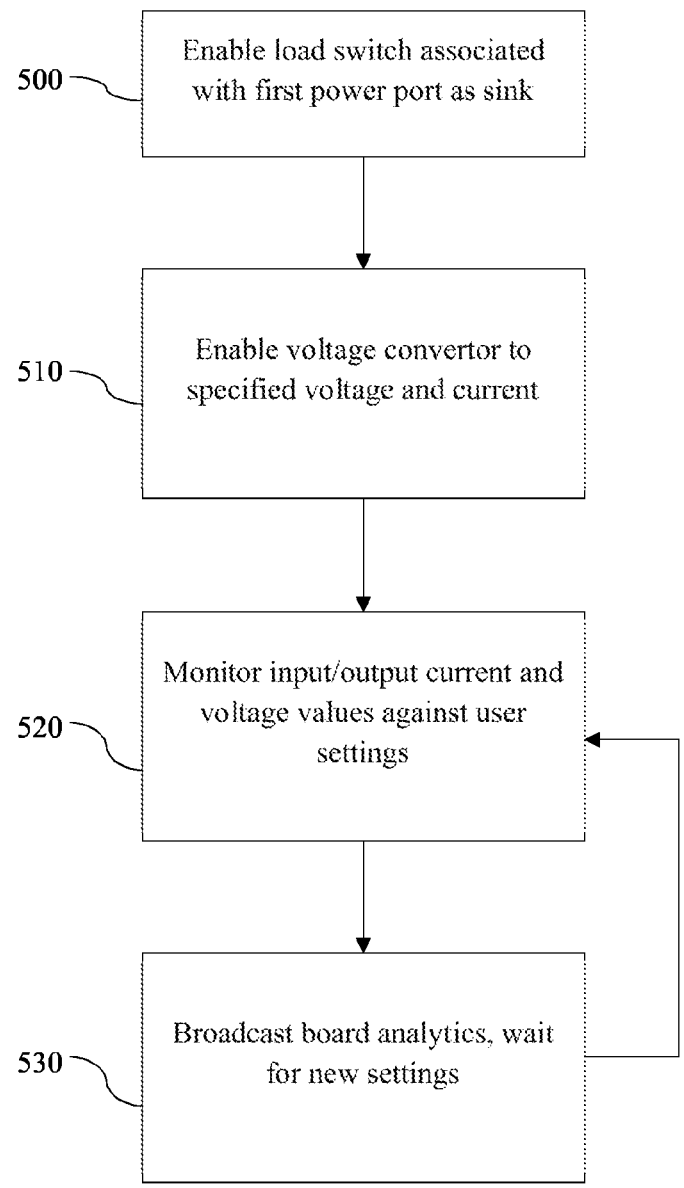
FIG. 5 is flowchart showing an example method of operation by the system according to one example in which the system is operating as a USB-Type C powered device.

FIG. 5 is an example process executed by the SoM 100 according to one example implementation. In the example of FIG. 5, the SoM 100 is operating as a USB-Type C powered device, for example a wired mobile phone sensor.

At step 500, the SoM 100 enables the load switch associated with the first power port 101 as a sink.

At step 510, the SoM 100 enables the voltage convertor 150 to convert electrical power received from the first power port 101 to a specified voltage and current. For example, in the case of the SoM 100 operating as part of a USB-Type C powered mobile phone sensor, the specified voltage and current values may be 12V 1A. This is supplied from the voltage convertor 150 to the sensors.

At step 520, the SoM 100 monitors current and voltage values in the system against user settings. For example, this may be performed by power monitor 140.

At step 530, the SoM 100 broadcasts the board analytics obtained by monitoring the current and voltage values in the system. For example, the SoM 100 may supply the board analytics to a user. The current and voltage information may also be supplied to the power multiplexor 120 for use in determining which power input should be used. The board analytics may also be supplied to connected devices, for example devices connected through a USB connection, in order to inform connected devices of power related information of the SoM 100. The SoM 100 waits for new settings, and returns to step 520 to continue monitoring.

Figure 6:
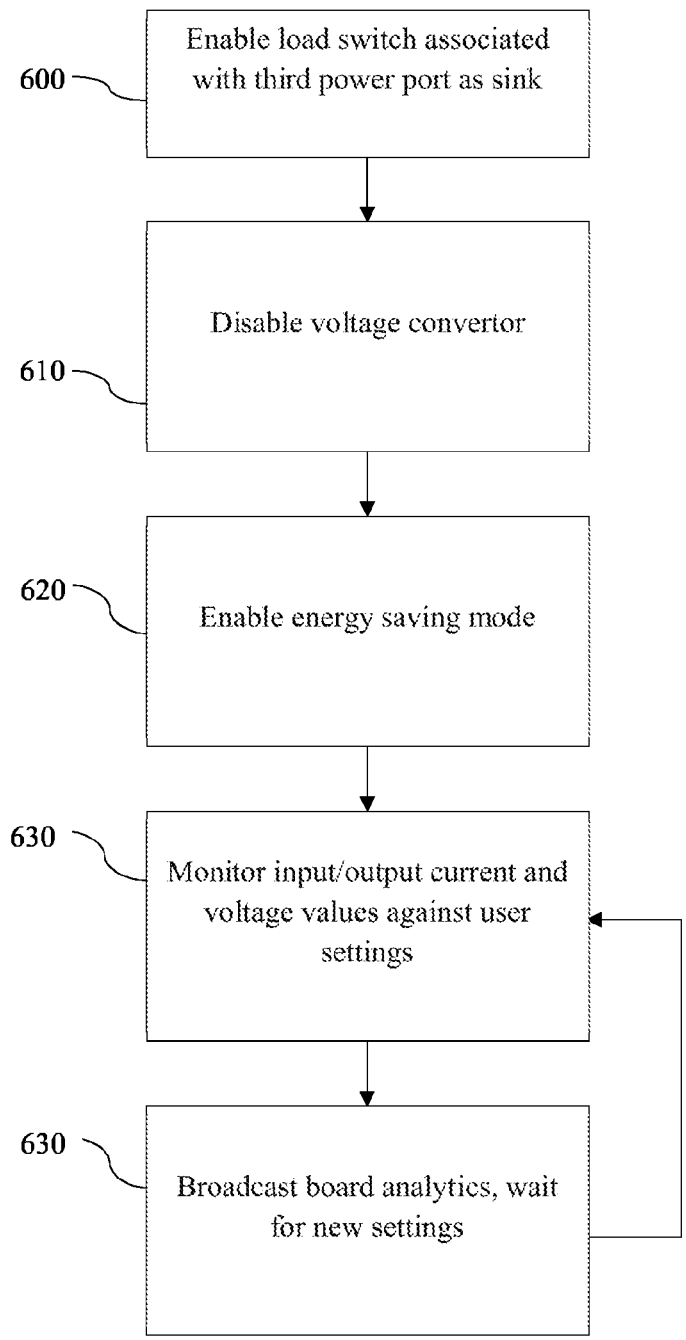
FIG. 6 is flowchart showing an example method of operation by the system according to one example in which the system is operating as a part of a battery powered energy saving device.

FIG. 6 is an example process executed by the SoM 100 according to one example implementation. In the example of FIG. 6, the SoM 100 is operating as a part of a battery powered energy saving device.

At step 600, the SoM 100 enables the load switch associated with the third power port 103 as a sink. In this example, the third power port 103 is connected to a rechargeable battery.

At step 610, the SoM 100 disables the voltage convertor 150.

At step 620, the SoM 100 enables energy saving mode. This will be discussed more in reference to FIG. 8. In the energy saving mode, the power supplied to the system MCU 130 is reduced to the lowest viable voltage and current values. In some examples, the main input to an energy saving device may be 3V 100 mA. The system MCU 130 may reduce its own supply down further to 1.8V or below.

At step 630, the SoM 100 monitors current and voltage values in the system against user settings. For example, this may be performed by power monitor 140.

At step 640, the SoM 100 broadcasts the board analytics obtained by monitoring the current and voltage values in the system. For example, the SoM 100 may supply the board analytics to a user. The current and voltage information may also be supplied to the power multiplexor 120 for use in determining which power input should be used. The board analytics may also be supplied to connected devices, for example devices connected through a USB connection, in order to inform connected devices of power related information of the SoM 100. The SoM 100 waits for new settings, and returns to step 630 to continue monitoring.

Figure 7:
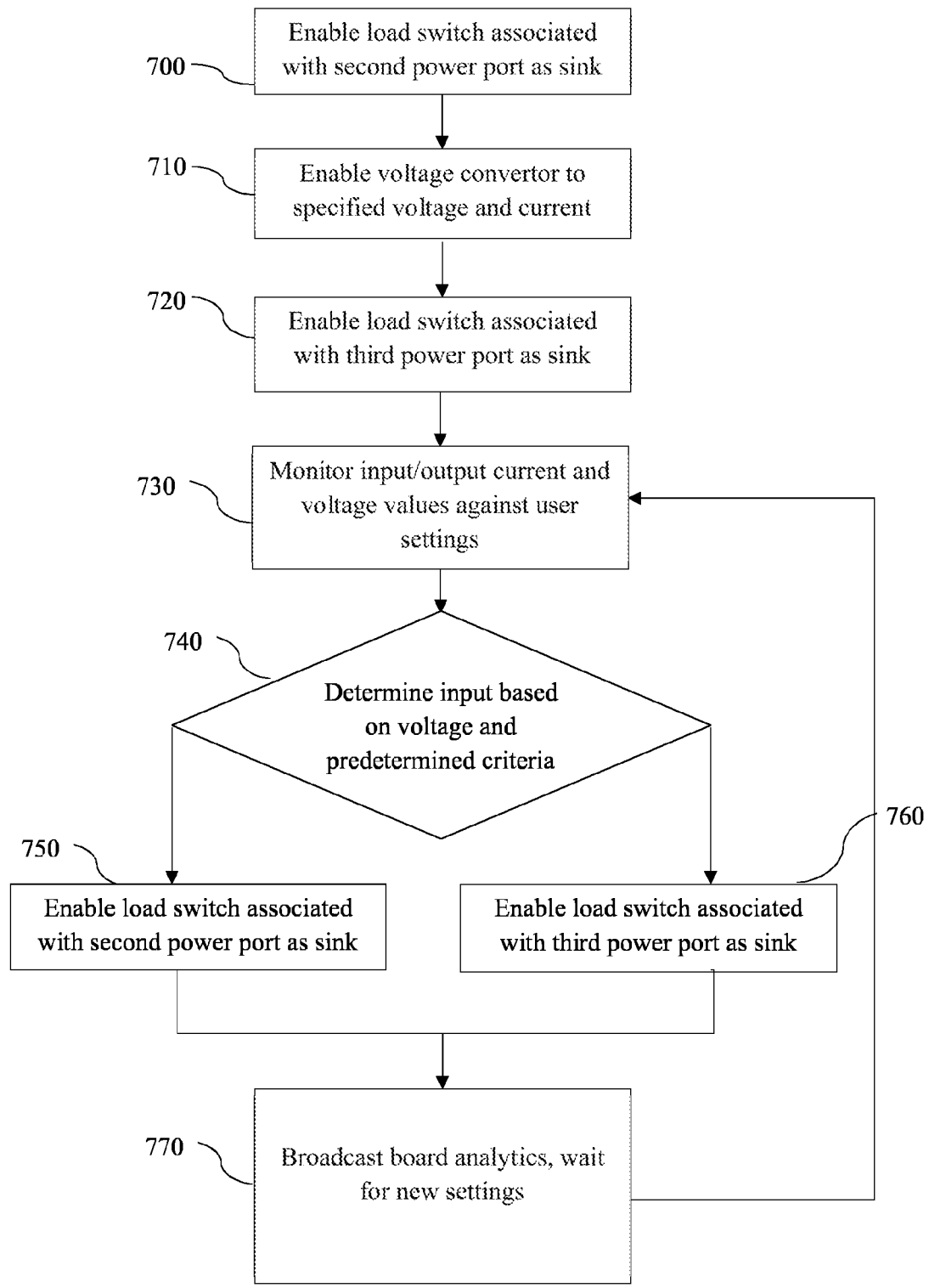
FIG. 7 is flowchart showing an example method of operation by the system according to one example in which the system is operating as a part of a solar device with a battery backup.

FIG. 7 is an example process executed by the SoM 100 according to one example implementation. In the example of FIG. 7, the SoM 100 is operating as a part of a solar device with a battery backup. In this example, the second power port 102 is connected to a solar cell, and the third power port 103 is connected to a rechargeable battery.

At step 700, the SoM 100 enables the load switch associated with the second power port 102 as a sink.

At step 710, the SoM 100 enables the voltage convertor 150 to convert electrical power received from the second power port 102 or the third power port 103 to a specified voltage and current. In this example, the specified voltage and current values may be 20V 5 A.

At step 720, the SoM 100 enables the load switch associated with the third power port 103 as a sink.

At step 730, the SoM 100 monitors current and voltage values in the system against user settings. For example, this may be performed by power monitor 140.

At step 740, the SoM 100 determines an input between the second power port 102 and the third power port 103 based on a measured voltage at each power port and a predetermined criterion. For example, the predetermined criteria may indicate a threshold voltage level, or that the SoM 100 should select the power port having the highest voltage. This step may occur at the power multiplexor 120.

If the second power port 102 is determined to be the input, then at step 750 the SoM 100 enables the load switch associated with the second power port 102 as a sink, and electrical power is supplied from the second power port 102 to the system MCU 130.

If the third power port 103 is determined to be the input, then at step 760 the SoM 100 enables the load switch associated with the third power port 103 as a sink, and electrical power is supplied from the third power port 103 to the system MCU 130.

At step 770, the SoM 100 broadcasts the board analytics obtained by monitoring the current and voltage values in the system. For example, the SoM 100 may supply the board analytics to a user. The current and voltage information may also be supplied to the power multiplexor 120 for use in determining which power input should be used. The board analytics may also be supplied to connected devices, for example devices connected through a USB connection, in order to inform connected devices of power related information of the SoM 100. The SoM 100 waits for new settings, and returns to step 730 to continue monitoring.

Figure 8:
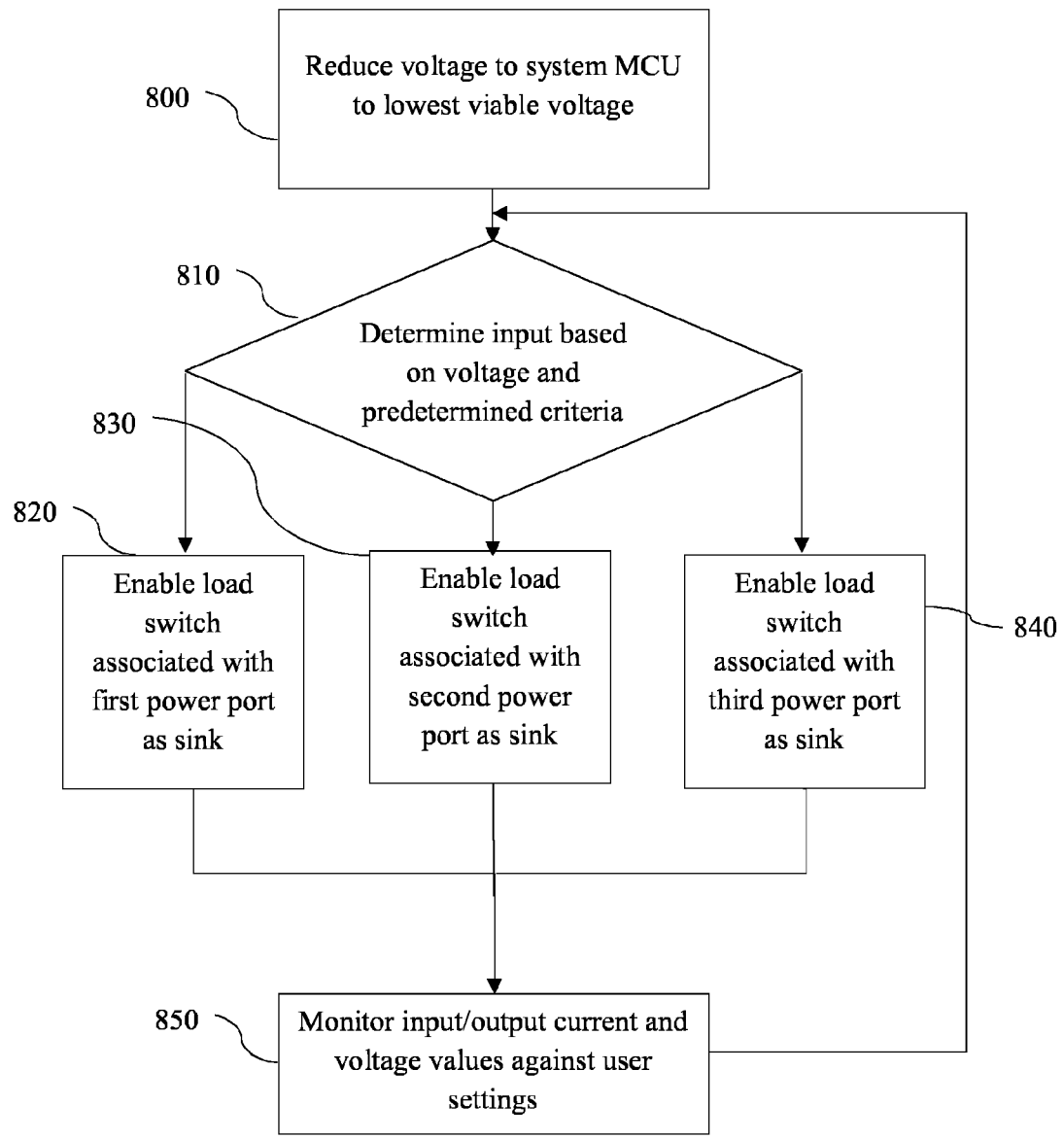
FIG. 8 is flowchart showing an example method of operation by the system according to one example in which the system operates in an autonomous power saving mode.

FIG. 8 is an example process executed by the SoM 100 according to one example implementation. In the example of FIG. 8, the SoM 100 operates in an autonomous power saving mode. In the example of FIG. 8, each of the first power port 101, the second power port 102, and the third power port 103 is capable of providing electrical power to the SoM 100. It is assumed that the SoM 100 is powered by one of the power ports at the beginning of this process.

At step 800, the SoM 100 reduces the power consumption of the system by instructing the power multiplexor 120 to supply electrical power to the system MCU 130 at the lowest viable voltage. As discussed earlier, the power multiplexor 120 may include a voltage convertor such that it can convert electrical power to a specified voltage or current. The lowest viable voltage may be dependent on the specification of the SoM 100 and any connected peripherals, as well consideration of which parts of the SoM 100 are required to be activated. For example, in a power saving mode, the system MCU 130 may operate on a reduced voltage, and may disable unused power multiplexor 120 channels and unused load switches.

At step 810, the SoM 100 determines an input between the first power port 101, the second power port 102 and the third power port 103 based on a measured voltage at each power port and a predetermined criterion. For example, the predetermined criterion may indicate a threshold voltage level, or that the SoM 100 should select the power port having the highest voltage. This step may occur at the power multiplexor 120.

If the first power port 101 is determined to be the input, then at step 820 the SoM 100 enables the load switch associated with the first power port 101 as a sink, and electrical power is supplied from the first power port 101 to the system MCU 130.

If the second power port 102 is determined to be the input, then at step 830 the SoM 100 enables the load switch associated with the second power port 102 as a sink, and electrical power is supplied from the second power port 102 to the system MCU 130.

If the third power port 103 is determined to be the input, then at step 840 the SoM 100 enables the load switch associated with the third power port 103 as a sink, and electrical power is supplied from the third power port 103 to the system MCU 130.

At step 850, the SoM 100 monitors current and voltage values in the system against user settings. For example, this may be performed by power monitor 140. The SoM 100 then returns to step 810 to continuously determine which power port to use as the power supply for the system MCU 130.

The system MCU 130 is programmable through a variety of methods. A number of examples of programming or debugging the SoM 100 are provided below. It should be understood that other methods of controlling the SoM 100 are possible, and that these would be understood by the skilled person.

A user may interact with the SoM 100, and in particular, control the programming of the system MCU 130, through a user interface. There are many known means of implementing user interface control of a device to a user. For example, the user may interact with a user interface on a remote device, such as a computer or mobile device, that communicates with the SoM 100 through wireless or wired connections. The user interface may display user friendly controls to allow the user to control and vary the power consumption of the SoM 100 itself as well as the power management of the power ports by the SoM 100.

The system MCU 130 is programmable and can be debugged and flashed over a USB2.0 CDC interface implemented as a bootloader. Alternatively, debugging may be performed via a JTAG interface. For example, the system MCU 130 may be connected to an external connector on a PCB to then connect to a debug tool. For example, an ST-Link debugger may be used.

A SoM 100 according to this disclosure can communicate with a second SoM 100 over a wired connection due to the bi-directional nature of USB-Type C cables, the circuitry of the SoM 100 and the dual role device/host USB-Type C controller. Two SoMs are programmable at the same time by using a JTAG adapter and connecting the USB cable to both SoMs.

When two SoMs according to this disclosure communicate with one another, a user of either device may interact with the other device to change settings, upload firmware, or send or receive data.

The present invention may be understood to relate to a System-on-Module (SoM) for facilitating dynamic reconfiguration of the direction and voltage-current values of power flow to and from multiple power ports of the SoM and within the SoM, such that the power consumption of and supply from the SoM can be readily controlled by a user for integration into or connection with an electronic device. The invention ensures that the SoM itself receives sufficient power from a connected power source while also providing highly configurable control over a plurality of power ports.

The present invention relates to a system 100 for power management of an electronic device, the device including the system 100 and being electrically connectable to an external device. The system 100 comprises a programmable system microcontroller 130 for controlling the system 100; a plurality of power ports configured to sink or source electrical power; and a programmable power multiplexor 120 connected between the power ports and the system microcontroller 130. The system 100 further comprises a plurality of bi-directional load switches connected between the power port and a bi-directional voltage convertor 150, and configurable to allow electrical power to flow through the bi-directional load switch in a first or second direction. The bi-directional voltage convertor 150 converts a first voltage supplied by the bi-directional load switch to a second voltage and supplies power at the second voltage to the electronic device or to the external device through at least one of the power ports. The programmable system microcontroller 130 controls the direction in which each bi-directional load switch allows power to flow and the second voltage of the bi-directional voltage convertor, such that the system 100 sinks or sources power at each of the plurality of power ports according to the programming of the system microcontroller 130.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A system for power management of an electronic device, the electronic device including the system and being electrically connectable to an external device, the system comprising:
a programmable system microcontroller configured to control the system;
a plurality of power ports, wherein each power port is configured to sink or source electrical power;
a plurality of bi-directional load switches each being configurable to allow electrical power to flow therethrough in one of a first direction or a second direction;
a bi-directional voltage convertor; and
a programmable power multiplexor electrically connected between the plurality of power ports and the system microcontroller, wherein the power multiplexor is configured to:
monitor a voltage received at each of the plurality of power ports;
determine a first power port of the plurality of power ports according to the voltage at the first power port and one or more predetermined criteria; and
supply power from the first power port to the system microcontroller; and
wherein each of the bi-directional load switches is electrically connected between an associated one of the plurality of power ports and the bi-directional voltage convertor;
wherein the bi-directional voltage convertor is configured to convert a first voltage supplied by one of the electrically connected bi-directional load switches to a second voltage and to supply power at the second voltage to the electronic device or to the external device through a second power port of the plurality of power ports via the bi-directional load switch associated with the second power port, wherein the bi-directional load switch supplying the first voltage and the bi-directional load switch associated with the second power port are different;
wherein the programmable system microcontroller is configured to control the direction in which each bi-directional load switch allows power to flow and the second voltage of the bi-directional voltage convertor, such that the system is adapted to route electrical power from any of the plurality of power ports to any other of the plurality of power ports according to the programming of the system microcontroller.

2. The system of claim 1, further comprising a power monitor electrically connected to the system microcontroller and configured to monitor and log information indicative of power, current or voltage values in the system.

3. The system of claim 1, wherein the plurality of power ports includes a power port configured to supply or receive power wirelessly or supply power to or receive power from a renewable power source.

4. The system of claim 1, wherein the plurality of power ports includes a power port configured to supply to or receive power from at least one rechargeable battery.

5. The system of claim 4, wherein the voltage convertor is further configured to convert electrical power received from one of the plurality of bi-directional load switches to a charging voltage for recharging the rechargeable battery.

6. The system of claim 1, wherein the plurality of power ports includes a power port configured to supply power to or receive power from a USB connector.

7. The system of claim 6, further comprising a USB power controller configured to transmit, through the USB connector to the external device, information including host-guest information and voltage-current information of the system.

8. The system of claim 1, further comprising a communication module configured to communicate with at least one external device.

9. The system of claim 1, further comprising a user processor, configured to communicate with the system microprocessor and execute user applications, wherein the system microprocessor operates in a slave mode with the user processor.

10. The system of claim 1, wherein the system is electrically connectable with a second system through one of the plurality of power ports.

11. The system of claim 1, wherein the power multiplexor is further configured to convert electrical power received from the voltage at the first power port to a predetermined output voltage based on the programming of the power multiplexor and supply the converted electrical power to the system microcontroller at the predetermined output voltage.

12. The system of claim 1, wherein the bi-directional load switches are further configured to operate in soft-start mode, wherein the bi-directional load switches switch on after a predetermined time period, such that an in-rush of power is prevented.

13. The system of claim 1, wherein each bi-directional load switch is further configured to: monitor current and voltage of power flow from or to the associated power port through the bi-directional load switch; and when the current or voltage are within a predetermined range, allow electrical power to flow through the bi-directional load switch in one of a first direction or a second direction.

14. The system of claim 13, wherein when the current or voltage are determined to be outside the predetermined range the bi-directional load switches are further configured to enter an isolated safe state and notify the system microprocessor.

15. The system of claim 1, wherein the system microcontroller is programmable by the external device, and the system is further configured to communicate with the external device through a wired or wireless connection.

16. The system of claim 1, wherein the system is a system-on-module, SoM, and comprises electronic components arranged in a single module.

17. A system for power management, the system comprising:
- a plurality of power ports;
- a plurality of bi-directional load switches, each bi-directional load switch being configurable to allow electrical power to flow therethrough in one of a first direction or a second direction and each bi-directional load switch being associated with a different one of the plurality of power ports;
- a system microcontroller;
- a voltage convertor;
- a power multiplexor electrically connected between the plurality of power ports and the system microcontroller;

wherein the system is adapted to route electrical power from any of the plurality of power ports to any other of the plurality of power ports by:
the programmable power multiplexor:
- monitoring a voltage received at each of the plurality of power ports;
- determining one of the plurality of power ports according to the voltage at the power port and one or more predetermined criteria; and
- suppling power from the determined power port to the system microcontroller; and the system microcontroller:
- determining at least one input power port and at least one output power port among the plurality of power ports according to its programming;
- controlling the bi-directional load switch associated with the determined input power port to allow electrical power to pass from the determined input power port through the associated bi-directional load switch to the voltage convertor;
- controlling the voltage convertor to convert voltage received from the bi-directional load switch associated with the input power port to a second voltage and supply electrical power at the second voltage to the bi-directional load switch associated with the output power port; and
- controlling the bi-directional load switch associated with the output power port to allow the electrical power to pass from the voltage convertor to the output power port.

18. The method of claim 17, wherein the plurality of power ports includes a power port configured to supply to or receive power from at least one rechargeable battery.

19. The system of claim 18, wherein the voltage convertor is further configured to convert electrical power received from one of the plurality of bi-directional load switches to a charging voltage for recharging the rechargeable battery.

* * * * *